No. 832,907.
PATENTED OCT. 9, 1906.
G. E. HARTER.
SEEDING MACHINE.
APPLICATION FILED MAR. 19, 1906.
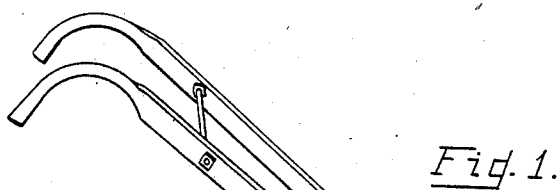
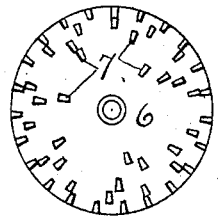
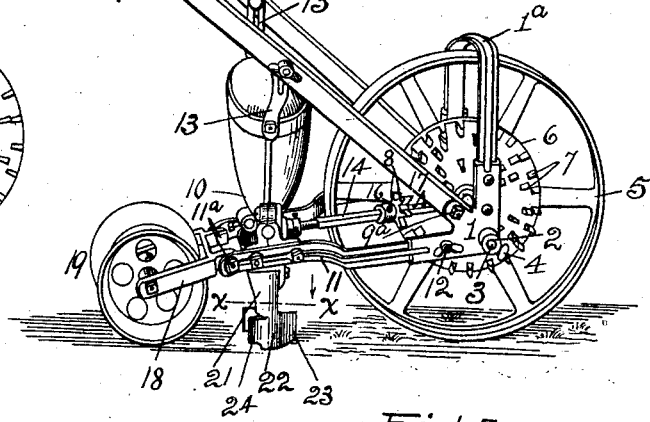
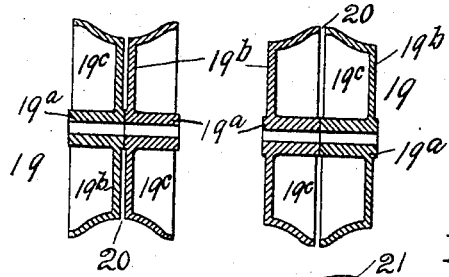
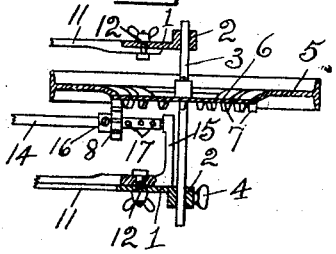
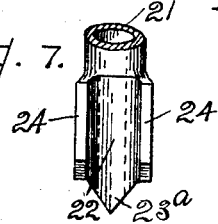
WITNESSES:
D. C. Walter
Cornell Schreiber
INVENTOR.
George E. Harter,
By Owen & Owen,
His attorneys.

UNITED STATES PATENT OFFICE.

GEORGE E. HARTER, OF TOLEDO, OHIO, ASSIGNOR TO THE OHIO IMPLEMENT COMPANY, OF TOLEDO, OHIO, A CORPORATION OF OHIO.

SEEDING-MACHINE.

No. 832,907.     Specification of Letters Patent.     Patented Oct. 9, 1906.

Application filed March 19, 1906. Serial No. 306,761.

*To all whom it may concern:*

Be it known that I, GEORGE E. HARTER, a citizen of the United States, and a resident of Toledo, in the county of Lucas and State of Ohio, have invented certain new and useful Improvements in Seeding-Machines; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to agricultural implements, and has special reference to improvements in seeding-machines.

One of the objects of my invention is the provision of a seeder of simplified and improved construction, which is capable of having its drive readily and quickly changed to effect a dropping or planting of all kinds of seeds in substantially continuous drill, or in hills which are spaced a predetermined distance apart, as the nature or manner of growing of the plant or vegetable may require.

A further object of the invention is the provision, in combination with the seeder, of a furrow-covering wheel which is adjustable or changeable to form either a ridge or a furrow, as the condition of the soil or the season of the year may require, and which is provided with a central annular opening whereby the ridge or furrow, as the case may be, is formed with a central unpacked strip to admit air and sunshine to the seeds and to prevent the smothering of tender shoots by the formation of a crust thereover, thus enabling a quick germination of the seeds.

A further object of my invention is the provision, in combination with a seeder, of a furrow-opener of improved and simplified construction, as hereinafter more fully described.

To these ends the invention consists of the several features of construction, combination, and arrangement of the parts, as is hereinafter fully described, and illustrated in the accompanying drawings, in which—

Figure 1 is a perspective view of the implement comprising the features of my invention. Fig. 2 is an elevation of the toothed disk of the drive-wheel, illustrating the arrangement of the several sets of teeth thereon whereby a differential dropping of the seeds may be accomplished. Figs. 3 and 4 are central cross-sections of the furrow-closing wheel with the parts thereof positioned to respectively form a ridge or furrow over the deposited seed. Fig. 5 is a cross-section of the drive-wheel and bearing-brackets therefor, with a portion of the associated parts shown in assembled position. Fig. 6 is a top plan view of the furrow-opener looking downward from the section-line $x\,x$ in Fig. 1, and Fig. 7 is a rear view thereof.

Referring to the drawings, 1 1 represent substantially L-shaped brackets or castings, which are oppositely disposed and provided adjacent their apexes with bearings 2, in which the ends of a shaft or axle 3 are mounted. A thumb or set screw 4 may be provided in either or both of said bearings to secure the shaft 3 in relatively fixed position, or it may be secured therein in any other suitable or convenient manner. The brackets 1 1 are firmly spaced apart by an arch or inverted-U-shaped member $1^a$, the terminals of the legs of which are secured to the vertical arms of said brackets.

A drive or carrier wheel 5 is mounted to turn loosely on the shaft 3 at a fixed point intermediate its bearings and is formed or provided concentrically with a disk 6, having a plurality of concentrically-arranged series of teeth 7 projecting from one face thereof, as shown in Figs. 1 and 2. The teeth of the several series are differently spaced, so that one series of teeth will impart a substantially continuous rotation to a sprocket-pinion or star-wheel 8, meshing therewith, while each of the other series when the pinion 8 is adjusted on its shaft for engagement therewith will impart an intermittent rotation thereto, the pauses in which rotation will be different from the pauses occasioned by an engagement of the pinion with any of the other series of teeth. Companion handle-bars 9 9 connect at their lower ends to the brackets or castings 1 1 in radial alinement with the shaft or axle 3, as shown at $9^a$ in Fig. 1, thus disposing the line of draft in direct alinement with the axle.

10 represents any suitable style of seeding apparatus, which is carried by a forked trailer-frame 11, the forwardly-projecting arms of which are secured to the horizontal arms of the opposite brackets 1 1 by bolts 12 or in any other suitable manner. This apparatus is relatively fixed to the handle-bars 9 9 by vertical arms 13, as shown, which arms also tend to support the handle-bars in proper position. The seeding apparatus has its feed controlled by a shaft 14, which carries the pinion or star wheel 8 for engagement with the different series of teeth 7 on the disk 6 of the drive-wheel. This shaft has its rear end suitably journaled in a portion of the frame of the seeding apparatus and its forward end journaled in a bearing provided in the end of an arm 15, which projects inwardly from the forward end of one of the arms of the trailer-frame 11 at right angles thereto, as shown in Fig. 5.

The pinion 8 is adjustable longitudinally of the shaft 14 to adapt it to be set in position thereon to coact with any one of the concentric series of teeth on the disk 6, thus enabling the feed of the seeder to be quickly changed from a continuous to any one of the different intermittent feeds provided for by the arrangement of the several series of teeth on the disk, or, vice versa, by simply loosening the set-screw 16 in the hub of the pinion and sliding the pinion to the desired position, after which the screw is again tightened. To provide for an easy and accurate adjustment of the pinion 8, I square the portion of the shaft 14 within the range of adjustment of the pinion, so as to prevent a relative turning of the pinion thereon when the set-screw 16 is loosened, and provide the side of the shaft with which the set-screw coacts with a number of recesses 17, corresponding in number to the series of teeth on the disk 6. One of these recesses is positioned to receive the inner end of the set-screw 16 when the pinion 8 is adjusted to register with any one of the series of teeth on the disk 6, thus furnishing a means for the accurate setting of the pinion in any of its several positions of adjustment.

Pivoted to the rear of the trailer-frame 11, as at 11ª, is a fork 18, carrying the covering-wheel 19. This wheel comprises two companion sections, which are correspondingly shaped, but reversely positioned to form right and left wheel-sections, as shown in Figs. 3 and 4. Each of these sections consists of a hub portion 19ª, from adjacent one end of which radiates a disk or spoke portion 19ᵇ, having its periphery formed with a lateral annular flange 19ᶜ. This flange is shown as having its circumference shaped to describe an ogee curve and as projecting over the portion of the hub extending farthest from its radiating-disk. The length of the hub 19ª is such as to cause its ends to project substantially an equal distance from the outer side of the disk 19ᵇ and the plane of the outer edge of the flange 19ᶜ, whereby a substantially equal opening 20 will be provided between the contiguous edges of the flanges of the two sections when they are positioned, as shown in Fig. 3, to conjointly form a concaved periphery, or, as shown in Fig. 4, to conjointly form a convexed periphery. The pivoting of the fork 18 to the frame 11 enables the covering-wheel 19 to act by gravity on the soil and relieves it of the uneven strains exerted on the handles. The purpose of forming the covering-wheel in this manner is to provide a single wheel the parts of which are reversible to form the surface of the ground traveled over into either a ridge or a furrow as the condition of the soil or the season of the year may require. In the early season of the year or in wet seasons it is preferable to form the earth inclosing the seeds in a ridge, so that the seeds will be elevated and a trench formed on each side thereof for taking off water. In dry seasons the wheel is used in its convex form, so as to pack the earth and form a furrow to hold moisture. The office of the peripheral opening 20 in wheels of this class is a very important one, as it prevents the packing of the earth or forming of a crust over the seed, thus rendering the air and sunshine accessible thereto to effect a quick germination of the seed and preventing a smothering of the tender shoots, which frequently occurs, due to the packing of the earth thereover by the follower-wheel. An enlargement of the opening 20 may be effected by placing a washer of the desired thickness between the adjacent ends of the hubs 19ª of the wheel parts. The forming of the wheel 19 in two parts in addition to rendering the wheel convertible to form either a ridge or a furrow also enables the two sections or parts to have independent rotary movements whereby to loosen and free the dirt which would otherwise become packed between the sections.

The boot 21 of the seeder terminates at its lower end in a furrow-opener 22, which is formed with a wedge-like nose-blade 23 for cutting the soil and with the rearwardly-extending vertical wings 24 24, as shown. The lower edge of the nose-blade 23 projects below the plane of the lower edge of the wings 24 and is formed in V shape, as shown at 23ª in Fig. 7, the taper of the sides of which expand or broaden in the same proportion that the blade thickens. The purpose of this formation of the blade is to form a furrow having a V-shaped bottom, so that the seeds will drop to the apex thereof, thus forming a straight row. The gradual thickening of the blade 23 causes the walls of the V-shaped furrow to be firmly packed and smoothed, so that they will retain their formation until the seeds have been dropped into the furrow and guided to the center thereof. As the furrow-opener passes along the portions of the walls which were held in place by the wings 24 collapse and fall inwardly upon and cover the deposited seed.

Having thus described my invention, what I claim as new, and desire to secure by Letters Patent, is—

1. A furrow-covering wheel comprising two reversible parts having their peripheries or treads fashioned to conjointly form a wheel having a circumferential ridge thereon the surface of which is circular in cross-section, or a wheel having a circumferential transversely-curved concavity, according to the relative position of the parts.

2. A furrow-covering wheel comprising in combination two reversible parts each having its tread fashioned to describe an ogee curve, whereby as the parts are placed together in one position their peripheries conjointly form a ridge circular in cross-section and when placed together in another position conjointly form a concaved periphery circular in cross-section.

3. In combination, a frame, a fork pivotally trailing therefrom, and a two-part covering-wheel carried by the fork, the parts thereof being reversible and fashioned to conjointly form a wheel having a convexed or a concaved periphery according to the relative positions thereof.

4. A furrow-opening tool comprising a hollow body open at its top and bottom, a blade projecting forwardly from such body and having a V-shaped bottom, and wings projecting rearwardly from each side of the body and having their lower ends terminating above the V-shaped under surface of the blade.

5. In a seeder, a seed-receiving boot having a wedge-like blade projecting forwardly from its lower end, and a vertical wing projecting rearwardly from each side adjacent to its lower end, the said blade having its lower edge projecting below the plane of the lower end of the body and formed in V shape, substantially as and for the purpose described.

In testimony whereof I have hereunto signed this specification in the presence of two subscribing witnesses.

GEORGE E. HARTER.

Witnesses:
C. W. OWEN,
CORNELL SCHREIBER.